United States Patent [19]
Lu et al.

[11] Patent Number: 5,493,430
[45] Date of Patent: Feb. 20, 1996

[54] COLOR, REFLECTIVE LIQUID CRYSTAL DISPLAYS

[75] Inventors: Minhua Lu, Kent; Haiji Yuan, Stow, both of Ohio; Zvi Yaniv, Farmington Hills, Mich.

[73] Assignee: Kent Display Systems, L.P., Kent, Ohio

[21] Appl. No.: 285,305

[22] Filed: Aug. 3, 1994

[51] Int. Cl.⁶ .................................................. G02F 1/1335
[52] U.S. Cl. ............................................ 359/68; 359/105
[58] Field of Search ............................... 359/68, 65, 105, 359/67

[56] References Cited

U.S. PATENT DOCUMENTS

| | | | |
|---|---|---|---|
| 4,032,218 | 6/1977 | Scheffer | 359/65 |
| 4,068,925 | 1/1978 | Tani et al. | 359/105 |
| 5,251,048 | 10/1993 | Doane et al. | 359/51 |

*Primary Examiner*—William L. Sikes
*Assistant Examiner*—James A. Dudek
*Attorney, Agent, or Firm*—Harness, Dickey & Pierce

[57] ABSTRACT

A display device (10) having first and second substrates (12) and (30) and a layer of a liquid crystal material having a periodic modulated structure, such as a PSCT or PFCT liquid crystal material disposed therebetween. A layer of a color imparting material (18) is disposed atop one surface of one substrate. The liquid crystal material is tailored or tuned to complementarily provide color to said display in connection with said layer of color imparting material.

18 Claims, 2 Drawing Sheets

COLOR, REFLECTIVE LIQUID CRYSTAL DISPLAYS

TECHNICAL FIELD

This invention relates in general to color liquid crystal displays, and in particular to reflective, polymer stabilized and polymer free cholesteric textured liquid crystal displays, and other types liquid crystal displays that reflect light by periodic structure.

Background

Recent concerted efforts in the field of liquid crystal materials have yielded a new class of reflective, cholesteric texture materials and devices. These materials, known as polymer stabilized cholesteric texture (PSCT) and polymer free cholesteric texture (PFCT) are fully described in, for example, U.S. Pat. No. 5,251,048 and patent application Ser. Nos. 07/694,840 and 07/969,093, the disclosures of which are incorporated herein by reference.

Reflective cholesteric texture liquid crystal displays (both PSCT and PFCT) have two stable states at a zero applied field. One such state is the planar texture state which reflects light at a preselected wavelength determined by the pitch of the cholesteric liquid crystal material itself. The other state is the focal conic texture state which is substantially optically transparent. By stable, it is meant that once set to one state or the other, the material will remain in that state, without the further application of a field, as is the course in conventional displays. Accordingly, the materials are highly desirable for low energy consumption applications, since once set they remain so set.

Applications for PSCT and PFCT materials have focused on reflective displays. Typically such reflective displays have had the back plate thereof painted black to absorb any non-reflected light. As a result, the displays show the contrast of green, yellow, or such other color determined by the pitch of the cholesteric texture material, on black. In fact, black has heretofore been preferred since it can provide for high contrast ratios.

However, by using black as a background, there are some substantial limitations. For example, most such displays are simply monochromatic. In principle, color may be varied from red to blue. However, for some colors, such as red and blue, contrast is very poor. Moreover, the colors presented are of relatively poor quality and appear grayish in hue. This is due to the fact that the reflective state of the display reflects only about 50% of the incident light of a certain spectrum width at the theoretical maximum. Or, in other words, the reflecting state of the display is partially transmissive. Accordingly, the background color appears to mix in with that of the reflecting state. When the background is black, the color reflected appears particularly dark and dull, especially yellow.

Attempts have been made to provide for multi-color and full color for such types of displays. For example, attempts have been made to add suitable dyes to the PSCT and PFCT materials. However, it was found such addition substantially increased the conductivity and reduces UV stability of the materials resulting in numerous technical problems such as shortening the display life. Moreover, some dye materials react with the photoinitiator and monomer, increasing manufacturing difficulties. Accordingly, only yellow and green displays have been shown to address the needs of the market.

Thus, there exists a need for enhanced, multicolor and full color PSCT and PFCT liquid crystal displays. In providing such color, the materials themselves may not be chemically altered so as to deleteriously effect the quality of the display device.

Summary of the Invention

Briefly, according to the invention, there is provided PSCT or PFCT liquid crystal display having a display back plate which actively colors the information shown on the display. Thus, instead of having a black painted back plate, the back plate is colored one or more other colors, such as red or green. The focal conic state of the display material shows the color or colors of the back plate, while the reflecting state shows the color selected by the preselected pitch of the material. While the reflecting state shows the color selected by the pre-selected pitch of the material and mixed with the background color. Since the reflecting state of the display reflects only about 50% or less incident light, the balance passes to the backplate where it may be either absorbed, or selectively reflected back depends on the color or type of the back coating material.

Since the background is now colored, partial transmissivity of the reflecting state of the display is not the problem as described in the prior art. In fact, by properly tailoring the back plate color, and the pitch of the display material, one may obtain different types of color displays. The function of the back paint is not only to show off the focal conic state, but also mixing with the reflecting light from helical structure to influence the final color of the display. Specific examples of such color devices include blue colored background, back plate, with a tuned display material that reflects yellow portions of the spectrum. The result is a white on blue, blue on white display not previously possible in prior art PSCT or PFCT display devices. Similarly, a yellow or orange colored background, back plate, with a tuned display material that reflects blue portions of the spectrum may be used. The result is a white on yellow or orange, yellow or orange on white display not previously possible in prior art PSCT or PFCT display devices. Of course, one may color the back plate a plurality of colors, in a patterned manner, with the material tuned in a complementary manner to provide a multicolor display. For example, a green display material plus a red and blue painted back plate, or a yellow display material with a blue and red back plate will result in a full color PSCT or PFCT display device.

Accordingly, it is an object of the instant invention to provide a color reflective cholesteric texture display, having good color contrast.

It is a further object of the instant invention to provide such a display device which may be easily manufactured, and not introduce additional sources of potential defects in the display liquid crystal material.

It is an additional advantage of the invention to provide a display with easy color adjustability and large color selections.

It is yet another advantage of the invention to provide a display with improved color in the reflecting state.

It is a further advantage of the invention to provide a display with a better viewing angle.

It is a further advantage of the invention to provide a color display with improved brightness and color saturation without using dyes in the liquid crystal mixtures and hence to improve display reliability.

DETAILED DESCRIPTION OF THE PREFERRED EMBODIMENT

Figure 1:
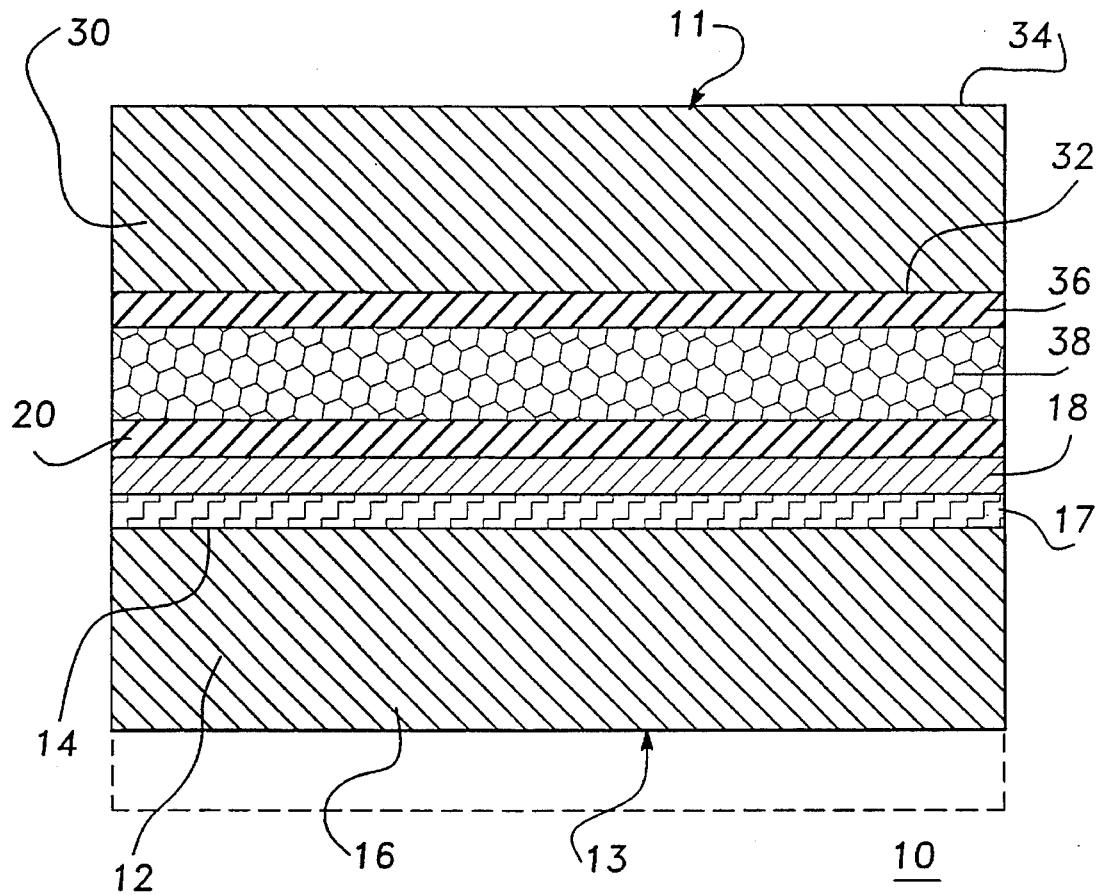
FIG. 1 is a cross-sectional side view of a color, reflective cholesteric texture liquid crystal display in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a cross-sectional side view of a PSCT or PFCT display device in accordance with the instant invention. The display device 10 includes a viewer proximal 11, and viewer distal 13 side. The display 10 further includes a first display substrate 12 fabricated of an insulating material such as glass, plastic, ceramic, or some other polymeric material, examples of which include Donnelly Applied Films' ITO coated sodalime glass substrates, Corning's silicate glass substrate, Southwall Technologies ITO coated plastic substrates and combinations thereof. The substrate 12 has first and second major surfaces 14 and 16. The second major surface 16 defines the viewer distal 13 side of the device. On the first major surface 14 of substrate 12 is disposed a layer of coloring or paint 18 adapted to impart color to light incident thereon, as it passes back through the liquid crystal material after reflecting off the back plate. On either surface 14 or 16 of substrate 12 is disposed a layer of coloring or paint 18 (and illustrated in phantom on surface 16) adapted to impart color to light incident thereon. As noted hereinabove, a surface 14 (for example) of the substrate 12 has heretofore been painted black to maximize absorption of light incident thereon. The surface 14 (or 16) herein is now painted or colored one or more non-black colors so as to maximize reflection of light thereon: Patterns of color or color stripes and columns may also be employed to impart color to the display. These embodiments are illustrated in greater detail hereinbelow with respect to FIGS. 2 and 3.

The color imparting or painted layer 18 may provide color by paint, dye in the layer, color films, color reflectors, or color dielectric substrates. Further, and as will be described in greater detail hereinbelow, the color may be dynamic, as opposed to static.

Disposed atop the painted layer 18 on the surface 14 of substrate 12 is an electrode layer 20. The electrode layer 20 should be a transparent electrode material so that light incident on the display will pass through the electrode layer 20 and reflect off the back paint layer 18. Accordingly, the electrode layer 20 is typically a thin layer of metal such as silver, copper, titanium, molybdenum, and combinations thereof. Alternatively, the electrode layer maybe a thin layer of a transparent conductive material such as indium tin oxide.

Disposed opposite the first substrate 12 is a second substrate 30 fabricated of a high quality, transparent material such a glass or plastic. The substrate 30 has first and second major surfaces 32, and 34 respectively. Disposed on the first major surface 32 is a transparent layer of conductive material 36, fabricated of materials such as those described hereinabove. Both substrate 12 and substrate 30 may further have a layer of insulating material or a layer of alignment material disposed thereon (not shown). The purpose of these layers is to enhance the performance of the liquid crystal materials disposed therebetween, as described in greater detail hereinbelow.

The substrates 12 and 30 are arranged in opposed, facing relationship so that said layers of conductive material are parallel and facing one another. Disposed between said layers of conductive material is a layer of a liquid crystal material having periodic modulated optical structure that reflects light, example of which include PSCT or PFCT liquid crystal material 38. The liquid crystal material comprises a nematic liquid crystal having positive dielectric anisotropy and chiral dopants. The material may or may not contain polymer gel or dye. The pitch of the cholesteric liquid crystal is in a range of between 0.25 to about 1.5 microns. Thus, an electrical field may be applied to a layer of PSCT or PFCT liquid crystal material disposed therebetween. Once such a field is applied, the material is set to one of two said stable states, where it will remain until a new field is applied.

Specific examples of such color display devices as described above include blue colored background, back plate, with a tuned display material that reflects yellow portions of the spectrum. The result is a white on blue, blue on white display not previously possible in prior art PSCT or PFCT display devices. Similarly, a yellow or orange colored background, back plate, with a tuned display material that reflects blue portions of the spectrum may be used. The result is a white on yellow or orange, yellow or orange on white display not previously possible in prior art PSCT or PFCT display devices.

It is further to be understood that the color imparting layer may further be provided in connection with a retroflecting layer, particularly for applications requiring high direct angle viewability, and low viewing angle. In this embodiment a retroreflector may be disposed under said layer of color imparting material, as, for example layer 17 of FIG. 1. It is to be understood however, that such a layer may be on either major surface of the substrate, or may be wholly separate from the substrate. For purposes of this application, the term retroreflector refers to a film or lens that reflects light back at the angle that it strikes the film. Hence, if light strikes the film at 90 degrees, substantially all of the light will be reflected directly back to 90 degrees. It may thus be appreciated that such a film would be highly desireable for direct viewing applications, while degrading wide viewing angles.

Figure 2:
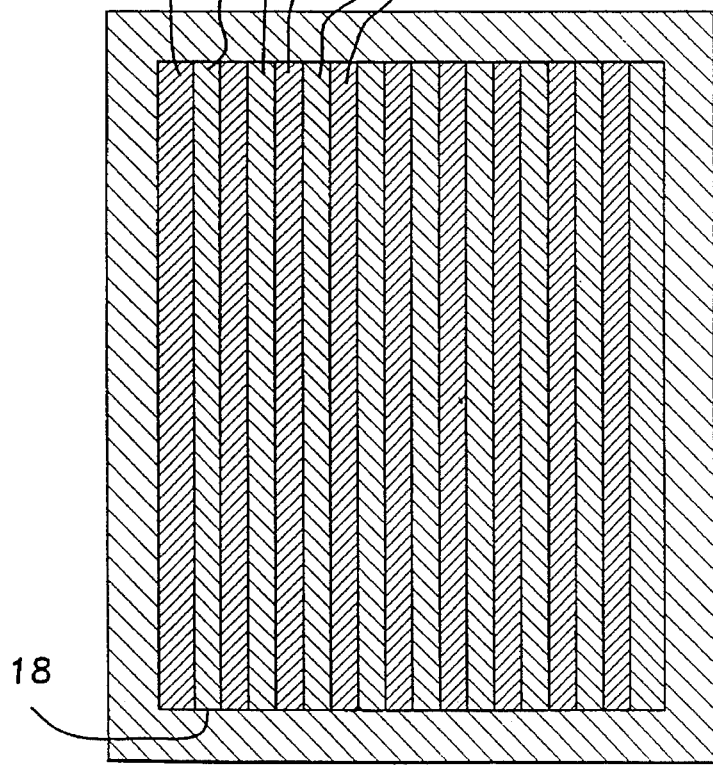
FIG. 2 is a front elevational view of the back plate of a cholesteric texture liquid crystal display in accordance with the instant invention.

Referring now to FIG. 2, there is illustrated therein a front elevational view of the first substrate 12 having the layer of coloring or paint 18 disposed thereon. In the embodiment illustrated in FIG. 2, the layer 18 comprises a plurality of color stripes 50, 52, 54, 56, 58, 60 running the vertical dimension of the substrate 12. Alternatively, the stripes could run the horizontal dimension of the substrate. The paint layer 18 could also be a single color, so long as the layer is not black.

Figure 3:
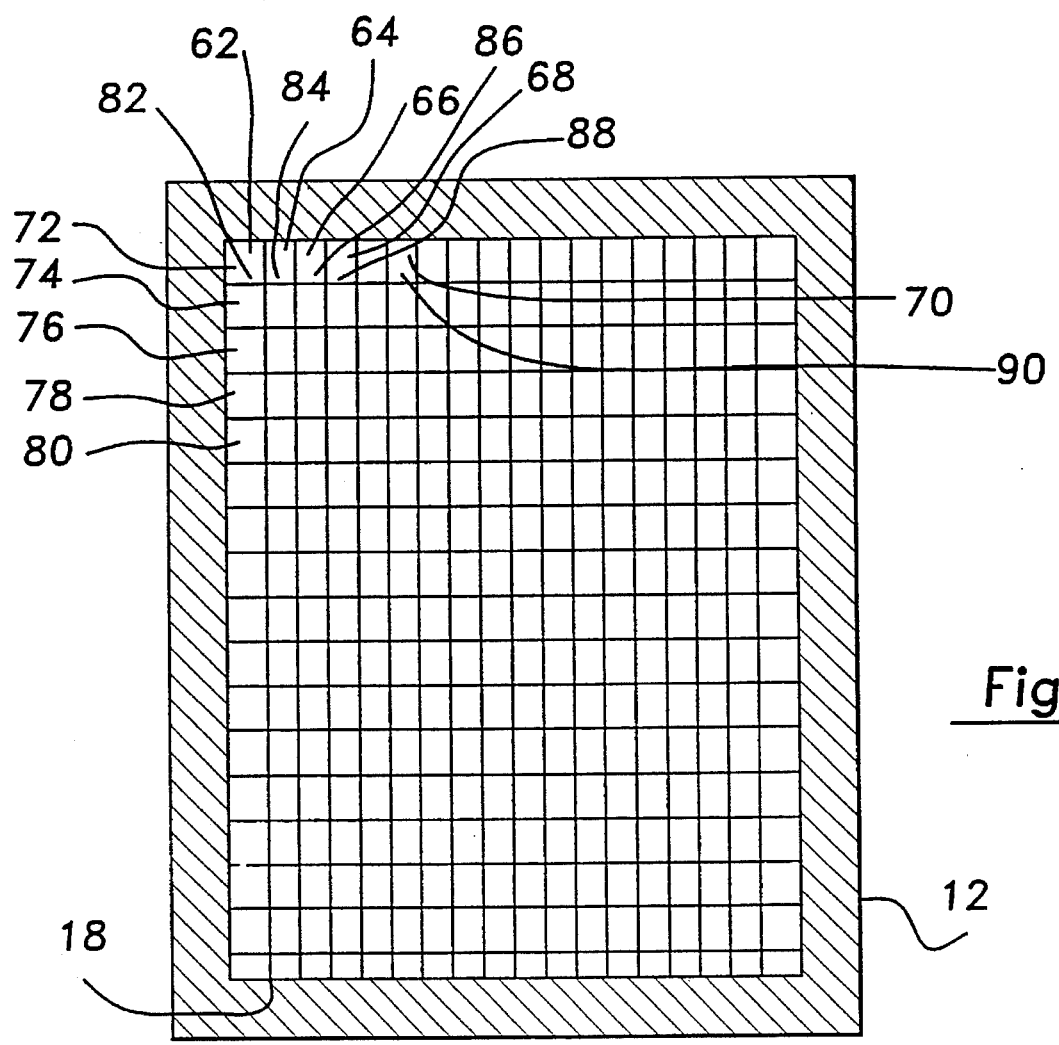
FIG. 3 is a front elevational view of an alternative embodiment of the back plate of a cholesteric texture liquid crystal display in accordance with the instant invention.

Another alternative embodiment of the instant invention is illustrated in FIG. 3 wherein the paint layer 18 is a plurality of rows, for example 60, 62, 64, 66, 68, and 70, and columns 72, 74, 76, 78, and 80 of color. Each intersection of a row and a column such as intersections 82, 84, 86, 88, and 90 define a different color.

As described hereinabove with respect to FIGS. 1–3, the layer of color imparting material has been a static layer. That is once color is provided, it remains the same. Alternatively, dynamic color may be provided by electrochromic, electrophoretic, photochromic, piezochromic thermochromic thin film color filters or other means or materials known in the art that change color as a result of the application of external factors such as an electromagnetic field, heat, light, pressure, chemical environment, or others. In an alternative embodiment, the dynamic color may be imparted by the use of a light emitting layer. The layer would of course be properly polarized and tuned to provide the desired optical color and effect.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A full color liquid crystal display having a viewer proximal and a viewer distal side, said display comprising:
   a first substrate having a first and second major surface, and having a color imparting layer disposed on one major surface thereof, and said second major surface defining said viewer distal side of said display;
   a second substrate disposed opposite said first substrate; and
   a layer of a liquid crystal material having periodic modulated optical structure that reflects light, disposed between said first and second substrates, said material having a first state in which said material is substantially transparent, and a second state which reflects light of a preselected wavelength, said preselected wavelength selected to complement the color imparted by said color imparting layer.

2. A display as in claim 1, wherein said liquid crystal material is a cholesteric texture liquid crystal material.

3. A display as in claim 2, wherein said liquid crystal material is polymer stabilized cholesteric texture liquid crystal material.

4. A display as in claim 2, wherein said liquid crystal material is polymer free cholesteric texture liquid crystal material.

5. A display as in claim 1, wherein said first and second substrates further include a layer of a transparent electrically conductive material.

6. A display as in claim 1, wherein said color imparting layer provides a plurality of colors.

7. A display as in claim 6, wherein said plurality of colors are arranged in a plurality of patterns.

8. A display as in claim 6, wherein said plurality of colors are arranged in a plurality of rows.

9. A display as in claim 6, wherein said plurality of colors are arranged in a plurality of rows and columns.

10. A display as in claim 1 wherein said color imparting layer is a colored paint.

11. A display as in claim 1 wherein said color imparting layer is a color reflector.

12. A display as in claim 1 wherein said color imparting layer is color dye.

13. A display as in claim 1 wherein said color imparting layer is an intrinsic color dielectric substrate.

14. A display as in claim 1 wherein said color imparting layer is a dynamic color imparting layer.

15. A display as in claim 1 wherein said color imparting layer is a dynamic color imparting layer.

16. A display as in claim 15, wherein said dynamic color imparting layer may be fabricated from an electrochromic device, an electrophoretic device, a photochromic device, a piezochromic device, a thermochromic device, and combinations thereof.

17. A display as in claim 1 wherein said color imparting layer is a light emitting material.

18. A display as in claim 1, further including a retroreflector disposed adjacent said first substrate.

* * * * *

UNITED STATES PATENT AND TRADEMARK OFFICE
CERTIFICATE OF CORRECTION

PATENT NO. : 5,493,430
DATED : February 20, 1996
INVENTOR(S) : Minhua Lu, et al.

It is certified that error appears in the above-indentified patent and that said Letters Patent is hereby corrected as shown below:

Column 1, Line 9, after "types" insert --of--.

Column 2, Lines 18 and 19, after "material" delete ". While the reflecting state shows the color selected by the pre-selected pitch of the material and".

Column 2, Line 22, delete "backplate" and insert --back plate--.

Column 2, Line 23, delete "depends" and insert --depending--.

Column 4, Line 5, delete "a" and insert --as--.

Column 5, Line 11, after "piezochromic" insert --,--.

Column 6, Line 30, Claim 14, delete "dynamic color imparting layer" and insert --thin film color filter--.

Signed and Sealed this

Twenty-first Day of January, 1997

Attest:

BRUCE LEHMAN

*Attesting Officer*  *Commissioner of Patents and Trademarks*